(12) United States Patent
Bang et al.

(10) Patent No.: US 10,126,794 B2
(45) Date of Patent: Nov. 13, 2018

(54) ELECTRONIC DEVICE, METHOD FOR POWER MANAGEMENT IN ELECTRONIC DEVICE AND RECORDING MEDIUM

(71) Applicant: Samsung Electronics Co., Ltd., Gyeonggi-do (KR)

(72) Inventors: Sung-Yong Bang, Gyeonggi-do (KR); Moo-Young Kim, Seoul (KR); Byung-Wook Kim, Gyeonggi-do (KR); Ju-Beam Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/054,636

(22) Filed: Feb. 26, 2016

(65) Prior Publication Data
US 2016/0252939 A1 Sep. 1, 2016

(30) Foreign Application Priority Data
Feb. 27, 2015 (KR) .................. 10-2015-0027970

(51) Int. Cl.
*G06F 1/20* (2006.01)
*G06F 1/26* (2006.01)
*G06F 1/16* (2006.01)

(52) U.S. Cl.
CPC .............. *G06F 1/26* (2013.01); *G06F 1/1626* (2013.01); *G06F 1/203* (2013.01); *G06F 1/206* (2013.01); *Y02D 10/16* (2018.01)

(58) Field of Classification Search
CPC .................. G06F 1/206; G06F 1/203
See application file for complete search history.

(56) References Cited

U.S. PATENT DOCUMENTS

| 2009/0290625 A1* | 11/2009 | Riddle | G06F 1/206 375/222 |
| 2012/0075992 A1* | 3/2012 | Shahidi | H04B 1/036 370/235 |
| 2012/0272086 A1* | 10/2012 | Anderson | G06F 1/206 713/340 |
| 2013/0097609 A1* | 4/2013 | Li | G06F 1/203 718/104 |

(Continued)

*Primary Examiner* — Albert Wang
(74) *Attorney, Agent, or Firm* — Cha & Reiter, LLC.

(57) ABSTRACT

An electronic device, method of operation thereof, and a recording medium are disclosed. An electronic device includes: a battery; a power management Integrated Circuit (IC) is connected to the battery; a plurality of components receive a power through the power management IC from the battery. A processor is connected to the plurality of components. A memory is electronically connected to the processor and stores instructions controlling the processor to monitor a power amount or an amount of electric current supplied to at least one electronic component among the plurality of the electronic components, and determine whether the power amount or the amount of electric current amount supplied to the at least one monitored electronic component is equal to or exceeds a predetermined value, and reduces a power amount or an amount of electric current of the at least one component or another component related to the at least one component.

19 Claims, 13 Drawing Sheets

(56) References Cited

U.S. PATENT DOCUMENTS

2013/0120630 A1* 5/2013 Kim .................. H04N 5/23241
                                                        348/333.01
2015/0229155 A1* 8/2015 Sporck ................. H02J 7/0073
                                                        320/107

* cited by examiner

ELECTRONIC DEVICE, METHOD FOR POWER MANAGEMENT IN ELECTRONIC DEVICE AND RECORDING MEDIUM

CLAIM OF PRIORITY

This application claims the benefit of priority under 35 U.S.C. § 119(a) from Korean Application Serial No. 10-2015-0027970, which was filed in the Korean Intellectual Property Office on Feb. 27, 2015, the entire content of which is hereby incorporated by reference.

BACKGROUND

Field of the Disclosure

The present disclosure relates to monitoring heat of components operating in an electronic device, an operation method thereof, and a recording medium.

Description of the Related Art

Recently, electronic devices such as a smart phones have become widespread in use, and almost everyone now has their own smart phone. Such electronic devices have become a part of the daily lives of users, and such users also recognize the difficulty of day-to-day life without use of such electronic devices It is now common for users of electronic devices to carry them around most of the time of their daily lives and an average time of using the electronic devices has gradually increased. The increased functionality of the electronic devices to perform various functions such as games and watching TV has only further accelerated the usage of such electronic devices.

As electronic devices continue to have an increase in usage, a characteristic of increase usage of the electronic devices is that various components (e.g., a CPU, and a memory) generate more heat with increased usage time. The heat generated by the electronic device may act as a restriction for the user of the electronic device and may possibly lead to premature equipment failure.

In a heat control method according to the conventional art, each temperature (variously referred to as an "internal temperature", a "component temperature", or the like according to the need in the present disclosure) of various components included in the electronic device is detected, and a surface temperature (variously referred to as an "external temperature", or the like according to the need in the present disclosure) of the electronic device is controlled on the basis of the detected internal temperature. In other words, in controlling the heat of the electronic device, the surface temperature felt by a user of the electronic device during actual use of the electronic device is estimated on the basis of the detected internal temperature to control the surface temperature of the electronic device. Accordingly, an accurate heat control function or operation is difficult to perform based on estimated temperature of the electronic device during actual use.

Further, in the heat control method for the electronic device according to the conventional art, a function or an operation for collectively controlling the heat with respect to all (or most) various components included in the electronic device is performed, so that a resource efficient heat control function or operation is difficult to perform.

SUMMARY

The present disclosure provides an electronic device and method which directly determines a surface temperature of the electronic device on a basis of an amount of electric current of the electronic device during actual use, and the electronic device can perform an accurate heat control function or operation by controlling a heat of the electronic device on the basis of the determined surface temperature.

The present disclosure provides an electronic device that controls the heat of the electronic device by reducing an amount of electric current being consumed in at least a part of a heating-managed component, which has been designated in accordance with an application executed in the electronic device, so that a resource effective heat control function or operation can be performed.

The present disclosure provides a method of the electronic device which directly determines a surface temperature of the electronic device on the basis of usage an electric current amount of the electronic device, and can perform an accurate heat control function or operation by controlling a heat of the electronic device on the basis of the determined surface temperature.

The present disclosure provides a method of the electronic device that controls the heat of the electronic device by reducing an amount of electric current being consumed in at least a part of a heating-managed component that has been designated in accordance with an application executed in the electronic device, The result is that a resource effective heat control function or operation can be performed.

The present disclosure provides a non-transitory medium which includes executable machine code when loaded into one or more processors controls records the method of operation of the electronic device to determine directly a surface temperature of the electronic device on the basis of an electric current amount of the electronic device. The direct determining of the surface temperature of the electronic device depends on the usage of the electronic device, and an accurate heat control function or operation may be performed by controlling a heat of the electronic device on the basis of the determined surface temperature.

The present disclosure provides a non-transitory medium having machine executable code to operate a method to control the heat of the electronic device by reducing an amount of electric current being consumed in at least a part of a heating-managed component that has been designated in accordance with an application executed in the electronic device, so that a resource effective heat control function or operation can be performed.

In accordance with an aspect of the present disclosure, an electronic device is provided that includes: a battery; a power management Integrated Circuit (IC) that is connected to the battery; a plurality of components (i.e. electronic components) that receive a power through the power management IC from the battery; a processor electronically connected to the plurality of components; and a non-transitory memory that is electronically connected to the processor, wherein the memory stores instructions that control the processor to, at the time of executing an application, monitor a power amount or an amount of electric current supplied to at least one electronic component from among the plurality of the electronic components, determine whether the power amount or the amount of electric current supplied to the at least one monitored electronic component is equal to a predetermined value or exceeds the predetermined value, and reduce a power amount or an amount of electric current the at least one component or another component related to the at least one component, on the basis of the determined result.

In accordance with another aspect of the present disclosure, a method of operating an electronic device is provided. The method includes: monitoring a power amount or an electric current amount supplied to at least one electronic component from among a plurality of the electronic components arranged in the electronic device; determining whether the power amount or the electric current amount supplied to the at least one monitored electronic component is equal to or exceeds a predetermined value; and reducing a power amount or an amount of electric current of the at least one component or another component related to the at least one component on the basis of the determined result.

In accordance with another aspect of the present disclosure, a computer readable non-transitory recording medium, in which instructions configured to execute at least one operation by at least one processor is stored is provided. The at least one operation includes: monitoring a power amount or an electric current amount supplied to at least one electronic component among a plurality of the electronic components arranged in the electronic device; determining whether the power amount or the electric current amount of the at least one electronic component is equal to or exceeds a predetermined value; and reducing a power amount or an amount of electric current of the at least one component or another component related to the at least one component on the basis of the determined result.

In accordance with yet another aspect of the present disclosure, an electronic device is provided. The electronic device includes a plurality of electronic components to execute an application in the electronic device, and a processor having circuitry configured to control a heating-managed component from among the plurality of electronic components, determine an amount of electric current or a power amount to identify a surface temperature of the electronic device according to the execution of the application, and reduce an electric current amount or a power amount for at least a part of the determined heat-managed component when the determined electric current amount exceeds a predetermined first threshold value.

According to the present disclosure, a surface temperature of the electronic device is directly determined on the basis of an amount of electric current of the electronic device depending on usage of the electronic device, and an accurate heat control function or operation can be performed by controlling a heat of the electronic device on the basis of the determined surface temperature.

According to the present disclosure, the heat of the electronic device is controlled by reducing an amount of electric current being consumed in at least a part of a heating-managed component that has been designated in accordance with an application executed in the electronic device. Therefore, a resource effective heat control function or operation can be performed.

The present disclosure does not limit the appended claims to the effects described herein, and it is well-understood to those skilled in the art that various effects are within the scope of the appended claims and their equivalents.

BRIEF DESCRIPTION OF THE DRAWINGS

The above and other aspects, features, and advantages of the present disclosure will become more apparent to the person of ordinary from the following detailed description taken in conjunction with the accompanying drawings, in which.

DETAILED DESCRIPTION

Figure 1:
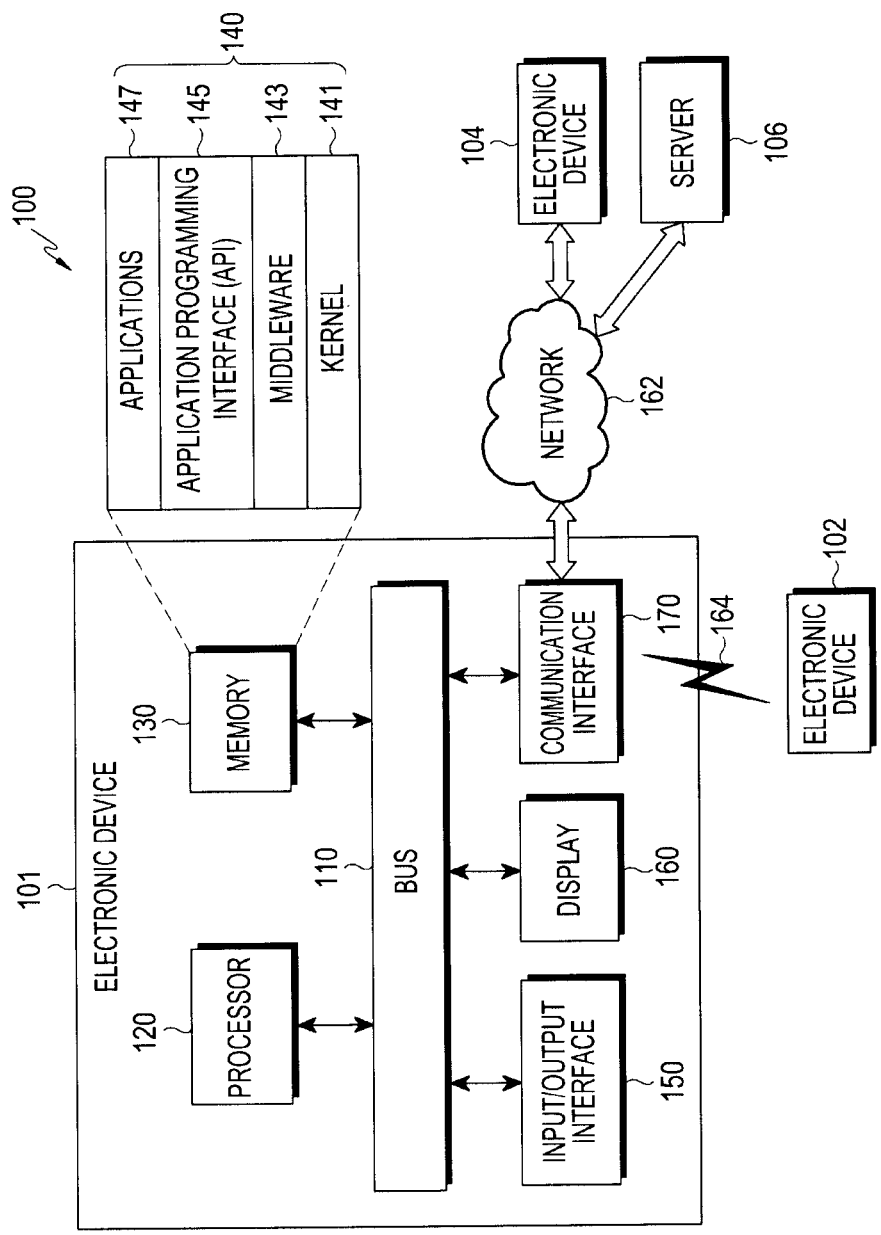
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the appended claims to the particular forms disclosed herein; rather, the present disclosure should be construed to cover various modifications, equivalents, and/or alternatives of embodiments of the appended claims. In describing the drawings, similar reference numerals may be used to designate similar constituent elements.

As used herein, the expression "have", "may have", "include", or "may include" refers to the existence of a corresponding feature (e.g., numeral, function, operation, or constituent element such as a component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices, although both of them are user devices. For example, a first element may be termed a second element, and similarly, a second element may be termed a first element without departing from the scope of the present disclosure and the appended claims.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have meanings equivalent to the contextual meanings in the relevant field of art as would be understood by a person of ordinary skill, and are not to be interpreted to have ideal or excessively formal meanings unless clearly defined in the present disclosure. In some cases, a term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the various aforementioned devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses or controls another electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit which interconnects the elements 110 to 170 and delivers a communication (e.g., a control message and/or data) between the elements 110 to 170.

The processor 120 may include one or more of a Central Processing Unit (CPU), an Application Processor (AP), and a Communication Processor (CP). The processor 120, for example, includes circuitry configured to carry out operations or data processing relating to control and/or communication of at least one other element of the electronic device 101.

The memory 130, which is non-transitory and may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Also, the input/output interface 150 may output commands or data received from other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106). Hardware such as a transmitter, receiver, transceiver, and one or more antennas may be included.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2A:
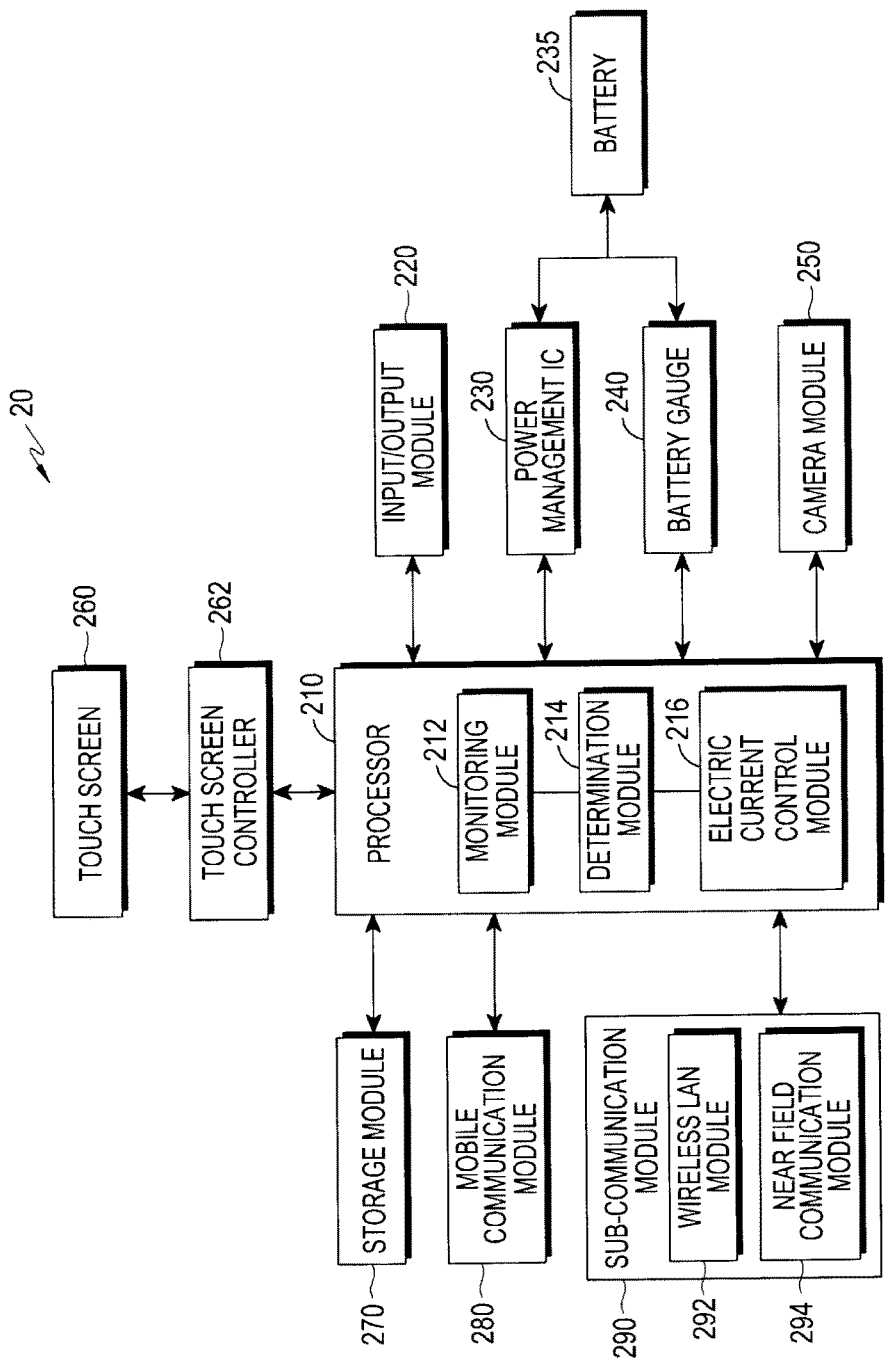
FIG. 2A, FIG. 2B and FIG. 2C illustrate an electronic device according to various embodiments of the present disclosure.
Figure 2B:
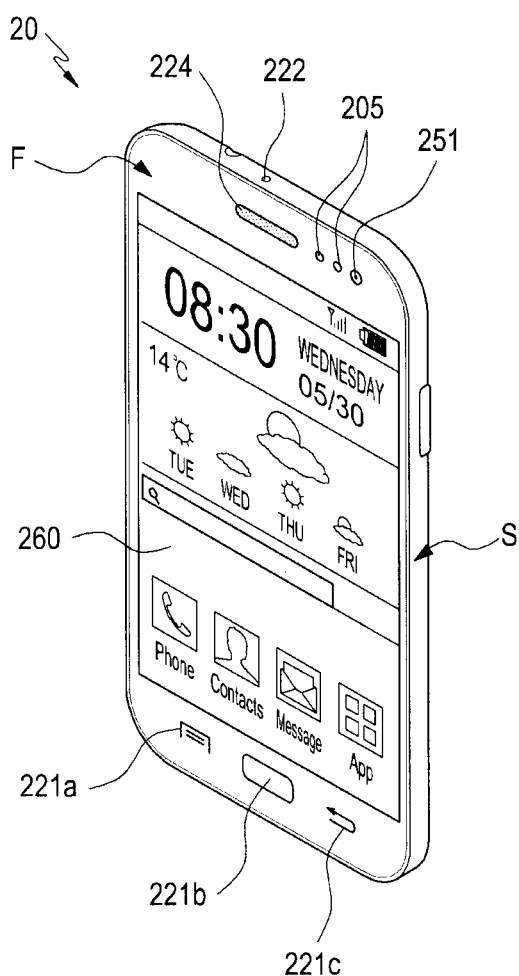
Figure 2C:
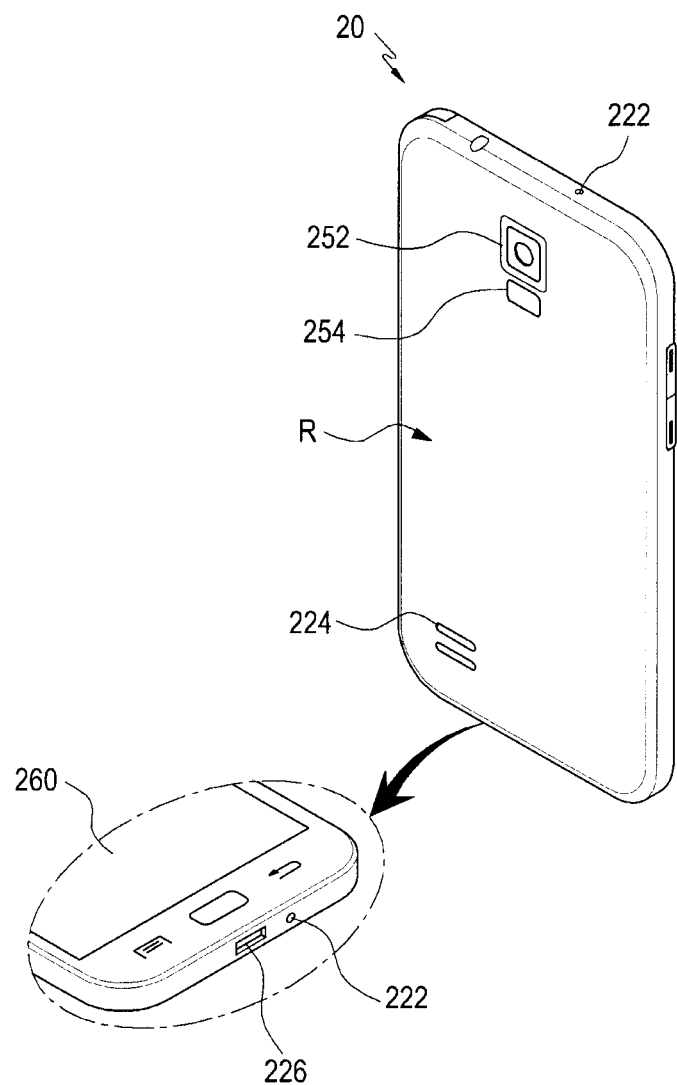

FIGS. 2A, 2B and 2C illustrate examples of an electronic device 20 according to various embodiments of the present disclosure.

Referring now to FIG. 2A, an electronic device 20 may include a processor 210, an input/output module 220, a power management IC 230, a battery gauge 240, a camera module 250, a touch screen 260, a touch screen controller 262, a storage module 270, a mobile communication module 280, and a sub-communication module 290.

The processor 210 may include, for example, a Central Processing Unit (CPU), a Read-Only Memory (ROM) in which a control program for controlling the electronic device 20 is stored, and a Random-Access Memory (RAM) which stores a signal or data input from the outside of the electronic device 20 or is used as a memory area for an operation performed in the electronic device 20. The CPU, ROM, and/or RAM may be interconnected through an internal BUS. The processor 210 may include, for example, a monitoring module 212, a determination module 214, and an electric current control module 216.

The monitoring module 212 may monitor a power amount or an amount of electric current supplied to at least one (electronic) component from among a plurality of electronic components arranged in the electronic device 20.

The determination module 214 may determine whether the power amount or the electric current amount of the at least one electronic component is identical to a predetermined value or exceeds the predetermined value.

The electric current control module 216 may control the reducing of an amount of electric current (or a power amount) of the at least one component or another component related to the at least one component on the basis of a result determined by the determination module 214.

Meanwhile, according to various embodiments of the present disclosure, a configuration of the processor 210 shown in FIG. 2A is an example, and at least one from among the monitoring module 212, the determination module 214, and the electric current control module 216 may be configured by a module separate from the processor 210. Further, according to various embodiments of the present disclosure, the term "processor 210" is interchangeable with a "controller", a "control module", or the like. In any event the processor includes hardware and is not software per se.

Referring to FIGS. 2A and 2B, the input/output module 220 may include a button (e.g., a menu button 221*a*, a home button 221*b*, a back button 221*c*, a microphone module (e.g., a microphone module 222), a speaker module (e.g., a speaker module 224), and a connector (e.g., a connector 226). There can also be a virtual button, virtual key, or other graphical interface.

The microphone module 222 transduce a vibration into an electric signal by receiving a voice or a sound under a control of the processor 210.

The speaker module 224 may output, to an exterior of the electronic device 20, a sound corresponding to various signals (e.g., a wireless signal, a broadcasting signal, a digital audio file, a digital video file, or picture photographing) under the control of the processor 210. The speaker module 224 may output a sound (e.g., a button operation tone corresponding to a phone call, or a ring back tone) corresponding to a function performed by the electronic device 20. One speaker module 224 or a plurality of speaker modules 224 may be included at a position or positions suitable for housing of the electronic device 20.

With reference to FIG. 2C, the connector 226 may be used as an interface for connecting the electronic device 20 and an external device (not shown) or a power source (not shown). The electronic device 20 may transmit data stored in a storage module (e.g., the storage module 270) of the electronic device 20 to the external device or receive the data from the external device through a wired cable connected to the connector 226 under the control of the processor 210. In this event, the external device may be, for example, a docking station, and the data may be an input signal transferred from an external input device, for example, a mouse, a keyboard, or the like. Further, the electronic device 20 may receive a power supply from the power source through the wired cable connected to the connector 226 or charge a battery (e.g., the battery 235) using the power source.

The power management Integrated Circuit (IC) 230 may manage, for example, a power operation of the electronic device 20. The power management IC 230 may include a wired and/or wireless charging scheme. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. According to various embodiments of the present disclosure, the power management IC 230 may detect an amount of electric current (or a power amount) of the heating-managed component at the current time and may provide, to the processor 210, information (i.e., data) on the electric current amount of the detected heating-managed component. In order to detect the electric current amount of the heating-managed component, the power management IC may include hardware (i.e., an additional circuit) which can detect the electric current amount.

The battery gauge 240 may include, for example, a fuel gauge Integrated Circuit (IC). The battery gauge 240 may measure at least one of the remaining amount of the battery 235, and a voltage, a current, and a temperature during charging. The battery 235 may include, for example, a rechargeable battery and/or a solar battery. In the present disclosure, even though it has been described that the power management IC 230 and the battery gauge 240 are divided, according to various embodiments of the present disclosure, the power management IC 230 and the battery gauge 240 may be integrally referred to as or configured as a single term of a "power management module".

The camera module 250 may include at least one of a first camera 251 arranged on the front (F) of the electronic device 20 and a second camera 252 arranged on the rear side (R) of the electronic device 20. Further, the first camera 251 or the second camera 252 may include an auxiliary light source (e.g., a flash 254) providing a light-amount required for photographing.

The touch screen 260 may provide, a user interface corresponding to various services (e.g., a call, data transmission, broadcasting, and photographing). The touch screen 260 may transmit an analog signal corresponding to at least one touch into the user interface to the touch screen controller 262. The touch screen 260 may receive at least one touch through the user's body (e.g., fingers including a thumb) or a touchable input means (e.g., a stylus pen). The touch screen 260 may receive a successive movements of one touch of the at least one touch. The touch screen 260 may transmit the analog signal corresponding to the successive movements of the input touch to the touch screen controller 262.

The touch as described above may include a "non-contact" in which, for example, a fingertip is detectable within a predetermined range of the screen without being limited to a contact with a body of the user or a touchable input means. An interval which can be detected in the touch screen 260 may be changed according to a performance or a structure of the electronic device 20. The touch screen 260, for example, may be implemented in a resistive type, a capacitive type, an infrared type, or an acoustic wave type.

The touch screen controller 262 may convert an analog signal received from the touch screen 260 into a digital signal (e.g., X and Y coordinates) to transmit the digital signal to the processor 210. The processor 210 may control the touch screen 260 using a digital signal received from the touch screen controller 262. For example, the processor 210 may allow, in response to the touch, a shortcut icon displayed on the touch screen 260 to be selected, or execute the shortcut icon. According to various embodiments of the present disclosure, various functions or operations which are performed by the touch screen controller 262 may be performed by the processor 210.

In the present disclosure, although it is disclosed that the touch screen 260 and the input/output module 220 are separated, the touch screen 260 and the input/output module 220 may be integrally referred to as or configured as a single term of an "input/output module".

The storage module 270 may store a signal or data which is input/output according to an operation of each element included in the electronic device 20, under the control of the processor 210. The storage module 270 may store a control program for a control of the electronic device 20 or the processor 210, and applications. The term "storage module"

may include the ROM, RAM, and/or the memory card inserted (i.e., mounted) to the electronic device 20, which are/is included in the storage module 270 and the processor 210. The storage module 270 may include a non-volatile memory, a volatile memory, a Hard Disk Drive (HDD), or a Solid State Drive (SSD).

The mobile communication module 280 may enable the electronic device 20 to be communicatively coupled to the external device through mobile communication using at least one or a plurality of antennas (not shown) under the control of the processor 210. The mobile communication module 280 may transmit/receive a wireless signal for a voice call, a video call, a text message (SMS) or a Multimedia Message (MMS) with a portable phone, a smart phone, a tablet PC, or another external device which has a phone number input in the electronic device 20.

The sub-communication module 290 may include at least one of a wireless LAN module 292 and a short-distance wireless communication module 294.

The electronic device 20 may be connected to the Internet in a place where an Access Point (AP) is installed through the wireless LAN module 292. The wireless LAN module 292 may support a wireless LAN standard (IEEE802.11x) of the Institute of Electrical and Electronics Engineers (IEEE). The electronic device 20 may wirelessly perform short-range communication with the external device through the short-range communication module 294. The short-range communication scheme may include a Bluetooth communication scheme, an Infrared Data Association (IrDA) scheme, a Wi-Fi Direct communication scheme, a Near Field Communication (NFC) scheme, and the like.

Referring now to FIGS. 2B and 2C, the electronic device 20 may include an external housing. The touch screen 260 may be included on front (F) (i.e., front of the external housing) of the electronic device 20. A home button, a menu button, and a back button may be included in the lower part of the touch screen 260, or along a top and/or one or more sides. Further, the first camera 251 and a sensor module 205 (e.g., an illumination sensor and a proximity sensor) may be included on the front (F) of the electronic device 20. The second camera 252, the flash 254, and the speaker module 224 may be included on the rear side (R) (i.e., the rear side of the external housing) of the electronic device 20. On the side (s) (i.e., a side of the external housing) of the electronic device 20, for example, there can be arranged a power/reset button, a volume control button, a terrestrial DMB antenna for broadcasting reception, one or a plurality of microphones may be included. The connector 226 and the microphone module 222 may be included in the lower end of the electronic device 20. The connector 226 may include a plurality of electrodes and be connected to the external device through the connector 226.

Figure 3A:
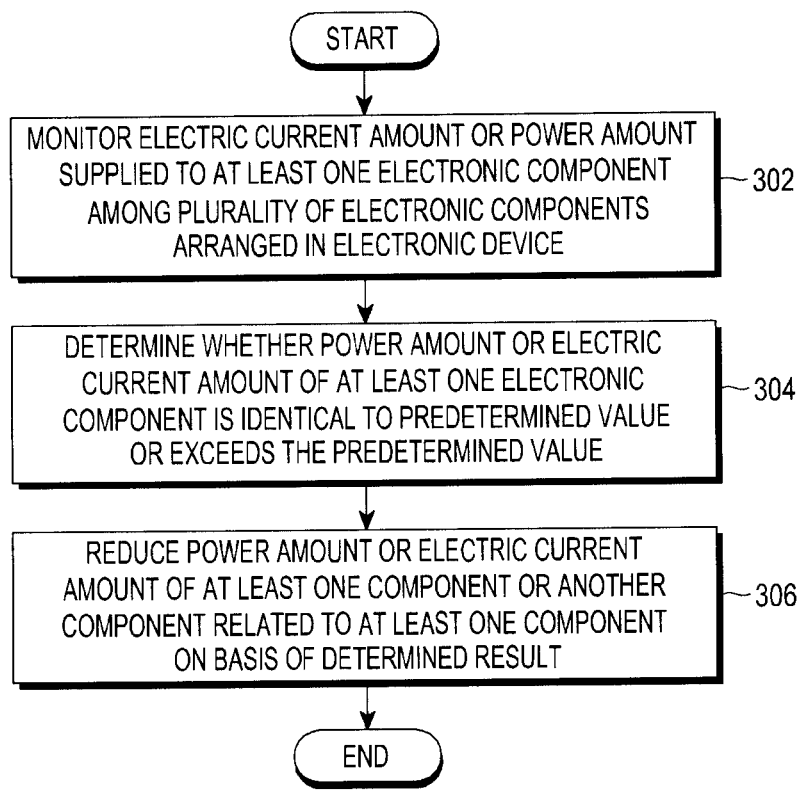
FIG. 3A illustrates a method of operating an electronic device according to various embodiments of the present disclosure.

FIG. 3A illustrates a method of operating an electronic device 20 according to various embodiments of the present disclosure.

Referring now to FIG. 3A, the electronic device 20 according to various embodiments of the present disclosure may include an operation 302 of monitoring a power amount or an amount of electric current supplied to at least one electronic component among a plurality of electronic components. The electronic device 20 according to various embodiments of the present disclosure may include an operation 304 of determining whether the power amount or the amount of electric current of the at least one electronic component is equal to or exceeds a predetermined value. The electronic device 20 according to various embodiments of the present disclosure may include an operation 306 of reducing a power amount or an amount of electric current of the at least one component or another component related to the at least one component, on the basis of the determination result.

Figure 3B:
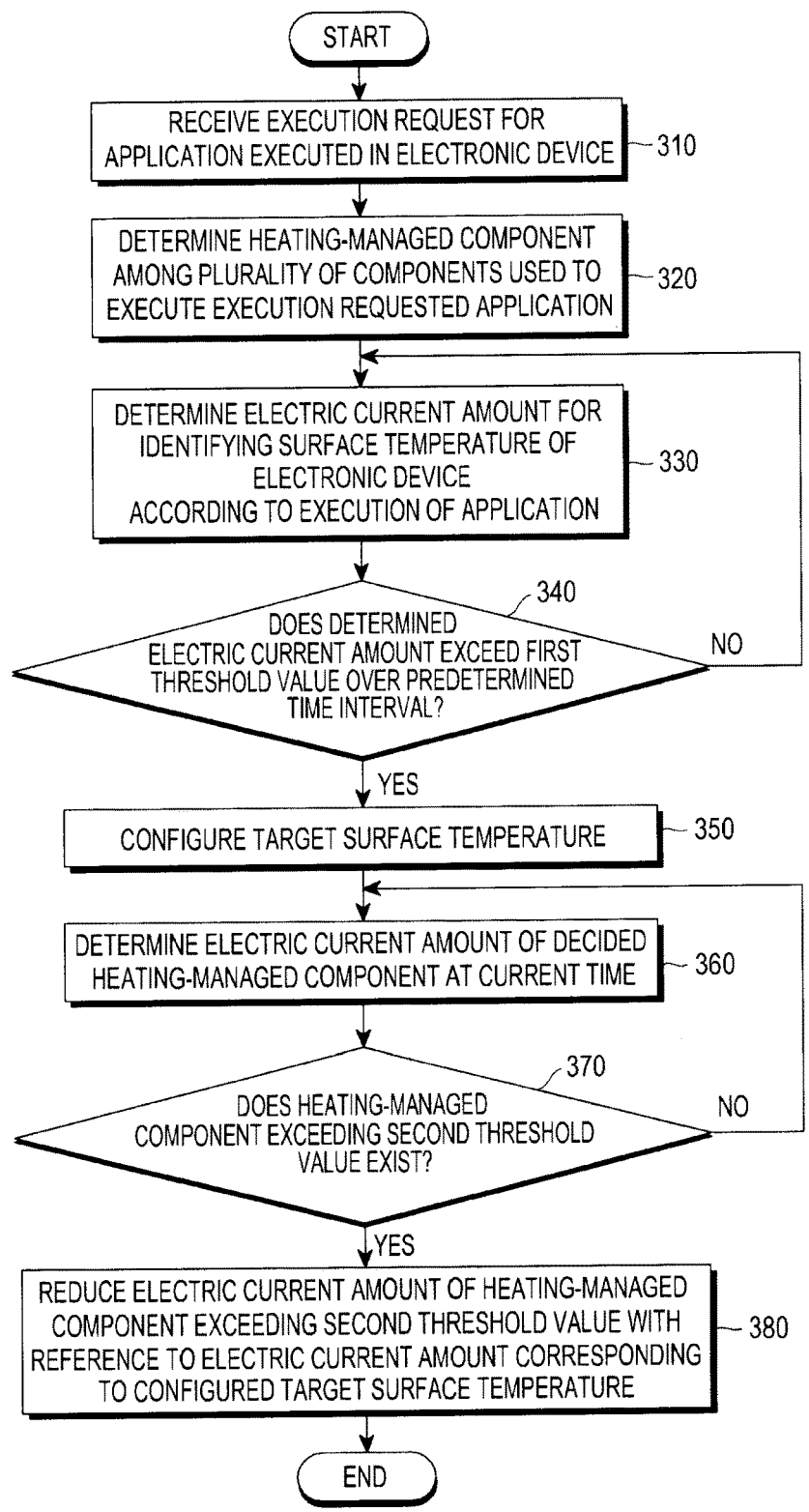
FIG. 3B illustrates a method of operating an electronic device as shown in FIG. 3A in more detail.

FIG. 3B illustrates a method of operating an electronic device described with reference to FIG. 3A in more detail.

Referring now to FIG. 3B, a method of operating an electronic device 20 according to various embodiments of the present disclosure may include an operation 310 of receiving an execution request for an application executed in the electronic device 20 from a user (e.g., a user 420). The execution request for the application may be received through an input module (e.g., the touch screen 260 or the input/output module 220) included in the electronic device 20. The application may include various applications such as a video call application, a webhard (e.g., N Drive™) application, and a camera application.

At operation 320 there is a decision regarding a heating-managed component from among a plurality of components used to execute the execution-requested application. A function or operation of deciding on the heating-managed component may be performed by a processor (e.g., the processor 120) arranged in the electronic device (e.g., the electronic device 20). The term "component" as described above may refer to various modules (e.g., the processor, the bus, and the communication module) which configure the electronic device 20 or are included in the electronic device 20.

The component (e.g., a camera module 430, a GPU 442, a bus 450, and a mobile communication module 460) to be heat-managed may be decided on by a type of the application executed in the electronic device 20 according to an execution request of the user. In a storage module (e.g., the storage module 270) of the electronic device 20, at least one piece of information on the heating-managed component corresponding to each application installed in the electronic device 20 may be stored in the form of a look-up table as shown in Table 1 below.

TABLE 1

| Application type | Heating-managed component |
|---|---|
| Video call application | Camera module, GPU, BUS, mobile communication module |
| Webhard application | Wireless LAN module, BUS, AP(big, LITTLE) |
| ... | ... |

The term "heating-managed component" as described in Table 1 above may refer to a component or components, which has/have the largest amount of electric current consumption (or, a power consumption amount) during the execution of the application, from among various components used to execute the application which the user has requested execution. The term "electric current amount consumed in the heating-managed component" may be replaced with various terms such as "electric current amount supplied to the heating-managed component" or "electric current amount flowing in the heating-managed component".

FIGS. 4A, 4B, 4C and 4D illustrate, as an example, a function or an operation in which the heating-managed component is decided on the basis of a corresponding relation as shown in Table 1. FIGS. 4A, 4B, 4C and 4D illustrate, as an example, components (e.g., camera module 430, GPU 422 (and/or AP 440), BUS 450, and mobile communication module 460) to be heat-managed according to various embodiments of the present disclosure, the components having been decided on correspondingly to a type of an application selected by the user 420.

Figure 4B:
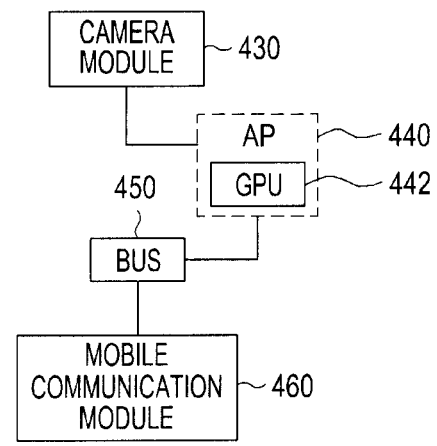
FIG. 4A, FIG. 4B, FIG. 4C and FIG. 4D illustrate some heating-managed components that are selected based on correspondence with a type of an application selected by a user, according to various embodiments of the present disclosure.
Figure 4A:
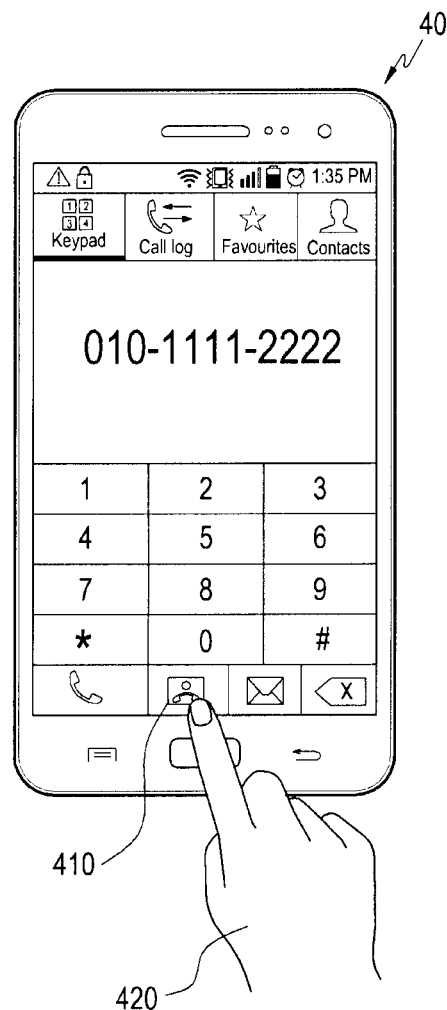

Referring now to FIGS. 4A and 4B, the electronic device (e.g., an electronic device 40) may receive a request for executing a video call application 410 for a video call (video telephony) from the user 420 of the electronic device 40. In response to the request, the processor may decide, for example, a camera module 430, a GPU 442, a BUS 450, and a mobile communication module 460 as the heating-managed components, according to a corresponding relation as shown in Table 1.

Figures 4C, 4D:
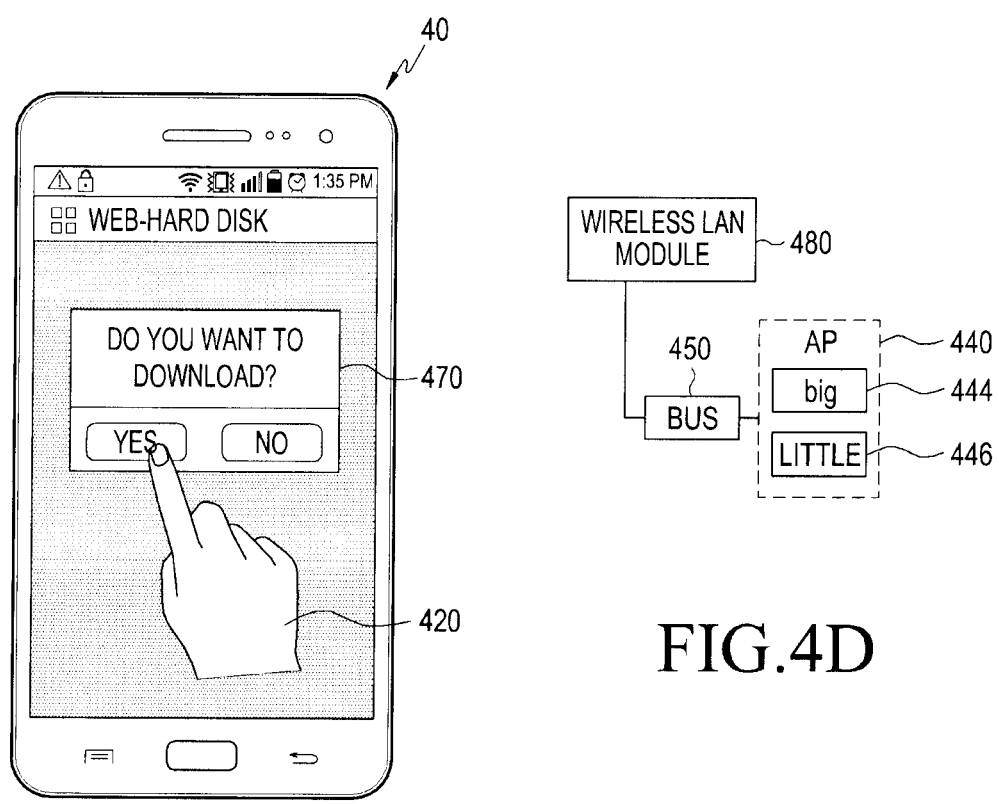

Referring now to FIGS. 4C and 4D, when a download request for specific data has been received from the user 420 of the electronic device 40 through, for example, a webhard application, the processor may determine, for example, an Application Processor (AP) (big 444 and LITTLE 446), a wireless LAN module 480, and a BUS 450 as the heating-managed component, according to a corresponding relation as shown in Table 1. The AP may include a processor (e.g., an octa-core processor) capable of big-LITTLE multi-processing. In this event, each operation scheme 444 and 446 of the AP 440 may be classified as different components as exemplarily shown in FIG. 4D. However, according to various embodiments of the present disclosure, even when the AP 440 corresponds to the processer capable of the big-LITTLE multi-processing, the AP 440 may be managed (or treated) as one component.

According to various embodiments of the present disclosure, unlike the embodiment described as shown in Table 1, the components (e.g., the camera module 430, the GPU 442, the BUS 450 and/or the mobile communication module 460) to be heat-managed may be dynamically decided on by a processor of the electronic device. That is, when an execution request for the application (e.g., the video call application) has been received from the user, the processor may sense electric current amounts of various components included in the electronic device. The processor may decide on the at least one heating-managed component, on the basis of the sensed electric current amount. For example, the processor may decide, as the heating-managed component, at least one component (as shown in FIG. 6D), which maintains an electric current amount exceeding a second threshold value (the "second threshold value" will be described below) during a predetermined time interval, among the sensed electric current amounts of the components. According to the embodiment in which the at least one heating-managed component is dynamically decided on, the heating-managed component may be decided on identically or differently with the heating-managed components as exemplarily described in Table 1.

According to various embodiments of the present disclosure, a method of sensing an electric current amount of a component/components of the electronic device may include various methods such as a polling scheme sensing the electric current amount according to a predetermined period for each component or an interrupt scheme sensing an electric current amount of the component/components at the current time when the component/components exceeds/exceed a predetermined electric current amount. Further, according to various embodiments of the present disclosure, the processor allows at least one sensing channel, which is configured to sense electric current amounts of various components of the electronic device to correspond one-on-one to at least one heating-managed component, thereby controlling the sensing of an amount of electric current of each of various components. In addition, the processor may control sequentially (i.e., in a rotation scheme) the sensing of the at least one heating-managed component through one sensing channel. When a current is sensed through the rotation scheme, a resource-efficient current sensing function/operation can be performed by reducing consumed power which is being consumed according to a current sensing function/operation. The term "sensing" as described above may be additionally or alternatively used as various terms such as "monitoring", "detection", "history" or "tracking".

Returning now to FIG. 3B, information on the heating-managed component as described in Table 1 may be previously stored in the electronic device in a manufacturing process of the electronic device. Further, when data of the application has been received from an external electronic device (e.g., the application provider server), the information on the heating-managed component may be received from the external electronic device together. In addition, after the application is installed in the electronic device 20, the information on the heating-managed component may be received from another external electronic device (e.g., the electronic device manufacturer server) different from the external electronic device. Although a plurality of components have been described as the heating-managed components in Table 1, according to various embodiments of the present disclosure, one component may be decided on as the heating-managed component.

A method of operating an electronic device according to various embodiments of the present disclosure may include an operation 310 of determining an amount of electric current for identifying a surface temperature of the electronic device depending on an execution of the application.

The surface temperature of the electronic device 20 may refer to a temperature actually recognized (or felt) in using the electronic device 20 by the user. In other words, the user may determine the degree by which the electronic device 20 has been heated, on the basis of the surface temperature. The surface temperature may refer to a temperature of a surface of the electronic device 20, which corresponds to a particular position where a component having the largest electric current consumption amount (or power consumption amount) is mounted when the electronic device 20 is being used, and a surrounding position, such as an AP of the electronic device 20. However, according to various embodiments of the present disclosure, the surface temperature may refer to an average temperature of a surface temperature of the front (F) of the electronic device 20 and a surface temperature of the rear side (R) of the electronic device 20.

Information (or, data) on an electric current amount for identifying a surface temperature of the electronic device 20 may be obtained (or sensed) by, for example, the battery gauge 240. The term "electric current amount for identifying the surface temperature of the electronic device 20" may be variously referred to as "an amount of electric current corresponding to the surface temperature", "an amount of electric current output (or supplied) from the battery", or "a first amount of electric current". The battery gauge 240 may provide information on the obtained amount of electric current to the processor, and the processor may determine a first amount of electric current of the electronic device 20 at the current time on the basis of information on the provided amount of electric current. An operation of sensing and determining the first electric current amount may be continuously/repeatedly performed during a predetermined time interval (e.g., from a time point at which an execution request of the application is received to a time point at which an execution termination request of the application is received).

However, according to various embodiments of the present disclosure, the battery gauge 240 may not perform a function or an operation of obtaining information of the first amount of electric current. That is, the battery gauge 240 may not include hardware (e.g., an additional circuit) for obtaining the information on the amount of electric current amount. In this event, with reference to the following look-up Table 2 (referred to as a "second look-up Table" according to the need) indicating a corresponding relationship of an amount of electric current defined according to each clock frequency input to components of the electronic device 20, the processor may determine on amounts of electric current of the components and determine an average value of the determined amounts of electric current as the first amount of electric current.

TABLE 2

| Component type | Clock freqeuncy (unit) | Electric current amount (mA) |
|---|---|---|
| AP (big) | 2.1 (GHz) | 450 |
| | 2.0 (GHz) | 430 |
| | 1.896 (GHz) | 410 |
| | . . . | . . . |
| GPU | 772 (Mhz) | 520 |
| | 700 (Mhz) | 500 |
| | 600 (Mhz) | 450 |
| | . . . | . . . |
| . . . | . . . | . . . |

According to various embodiments of the present disclosure, an operation of determining the first amount of electric current on the basis of the second look-up table may be continuously/repeatedly performed during a predetermined time interval (e.g., from a time point at which an execution request of the application is received to a time point at which an execution of the application is terminated). An amount of electric current defined according to the each clock frequency may correspond to data defined by being experimentally (or empirically) measured according to the clock frequency.

According to various embodiments of the present disclosure, the storage module 270 of the electronic device may previously store a look-up table (referred to as a "third look-up table" according to the need) indicating a corresponding relationship with the surface temperature (e.g., 29° C., 31° C.) defined according to the first electric current amount (e.g., 1.5 Ampere (A), 2 A, or the like) during a predetermined time interval (e.g., 5 minutes). A method of operating the electronic device 20 according to various embodiments of the present disclosure may include an operation 350 of configuring a target surface temperature (e.g., 35° C.) by the processor when a predetermined time interval (e.g., 20 seconds) elapses (340-Y) in a state in which the determined first electric current amount exceeds the first threshold value (e.g., 3 A). The target surface temperature may refer to a temperature configured by the electronic device 20 or the user in order to reduce a the current degree by which the electronic device 20 has been heated, i.e., a temperature at which it is estimated that the user does not feel displeasure due to heat of the electronic device 20. The target surface temperature may be previously configured in a manufacturing process of the electronic device 20, or may be configured by the user. Information included in the third look-up table may correspond to information defined by being experimentally (or empirically) measured.

Figure 5:
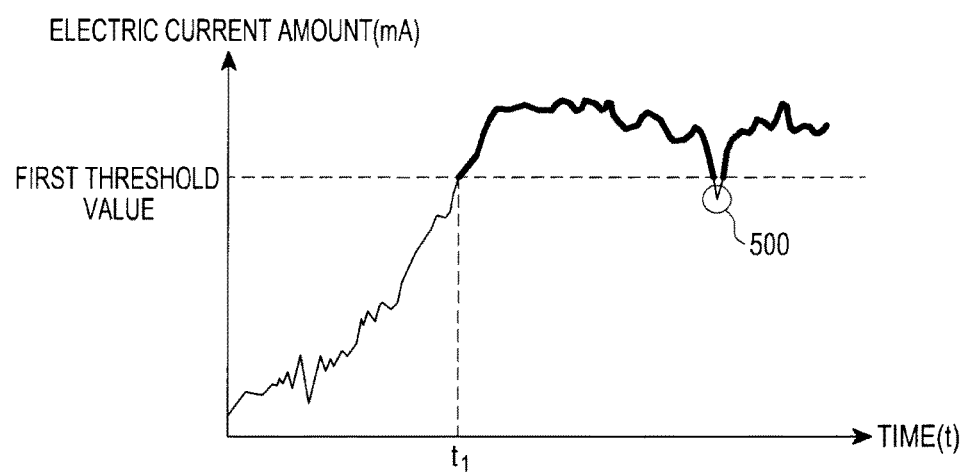
FIG. 5 illustrates an example of a change of an amount of electric current of the electronic device utilized to determine a surface temperature of the electronic device according to various embodiments of the present disclosure.

A more detailed description for operation 340 will be described with reference to FIG. 5 of the present disclosure. FIG. 5 illustrates an example of a change of an electric current amount of the electronic device for determining a surface temperature of the electronic device according to various embodiments of the present disclosure.

Referring now to FIG. 5, an amount of electric current (i.e., the first amount of electric current) of the electronic device 20 according to a continuous execution of the application may be repeatedly/sequentially changed as shown in FIG. 5. According to the continuous execution of the application, the first amount of electric current may exceed the first threshold value at a specific time point (t1) (i.e., a triggering point) during the execution of the application. However, as indicated by a reference numeral 500 in FIG. 5, a momentary excess (i.e., an excess within a predetermined time interval (e.g., 10 seconds)) of the first threshold value may be ignored.

Returning now to FIG. 3B, a method of operating the electronic device 20 according to various embodiments of the present disclosure may include an operation 360 of determining an amount of electric current of the determined heating-managed component. Hereinafter, a plurality of heating-managed components will be described for the convenience of the present disclosure. Information on an electric current amount (referred to as a "second amount of electric current" according to the need) of each of the heating-managed components may be obtained by, for example, the power management IC 230. The information on the second amount of electric current obtained by the power management IC 230 may be provided to the processor. However, when the power management IC 230 does not include hardware for obtaining information on the electric current amount (i.e., when the amount of electric current cannot be detected), the amount of electric current of the heating-managed component may be determined by the processor on the basis of a look-up table defined in Table 2.

The method of operating an electronic device according to various embodiments of the present disclosure may include an operation 370 of determining whether a heating-managed component, which exceeds a second threshold value, exists among the heating-managed components. Further, the method of operating an electronic device according to various embodiments of the present disclosure may include an operation 380 of reducing an amount of an electric current of a heating-managed component, which has a large (i.e., exceeding the second threshold value) amount of electric current in order to reach the configured target surface temperature (i.e., in order to maintain the target surface temperature). Herein, the second threshold value may refer to an amount of electric current that is a reference for determining on the heating-managed component to reduce the amount of electric current. A content related to operations 370 and 380 will be described with reference to FIGS. 6A, 6B, 6C and 6D. FIGS. 6A, 6B, 6C and 6D illustrate an example of a change of an amount of electric current for each of heating-managed components according to various embodiments of the present disclosure. In addition, for the convenience of the description of the present disclosure, FIGS. 6A, 6B, 6C and 6D illustrate, as an example, a case in which the video call application is executed.

Figure 6A:
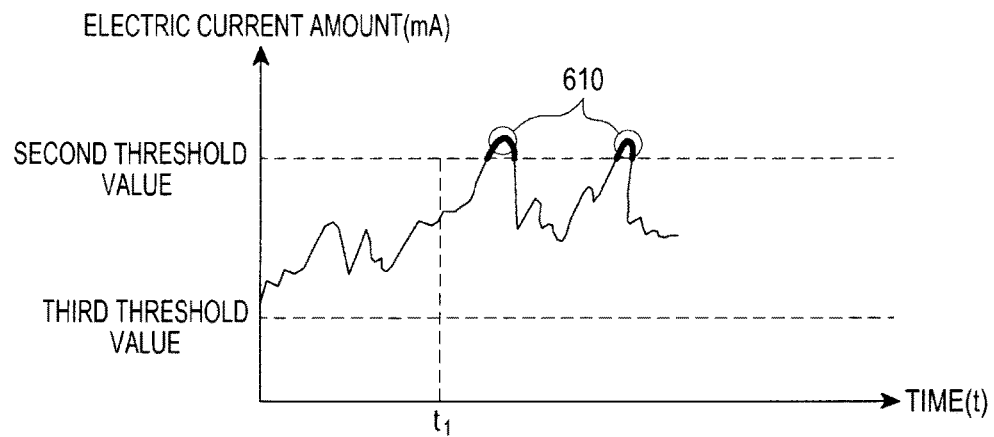
FIG. 6A, FIG. 6B, FIG. 6C and FIG. 6D illustrate a change of an amount of an electric current for each of the heating-managed components according to various embodiments of the present disclosure.

FIG. 6A illustrates, as an example, a change of an amount of electric current of the GPU 442. Referring to FIG. 6A, although there is an interval 610 in which a change in the amount of electric current of the GPU 442 temporarily exceeds the second threshold value after the triggering point (t1), since it is possible to ignore a case which temporarily exceeds the threshold value, as described above, the processor may not reduce an electric current amount of the GPU 442.

Figure 6B:
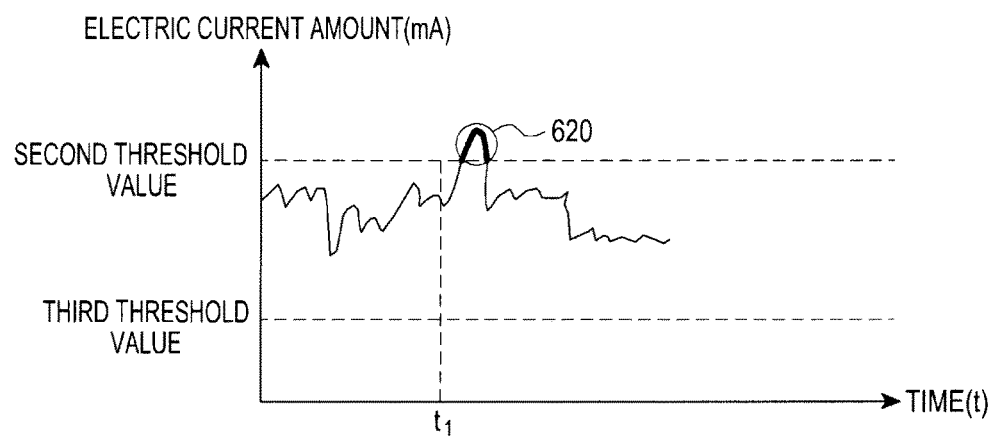

FIG. 6B illustrates, as an example, a change of an amount of electric current of the BUS (e.g., BUS 450). Referring now to FIG. 6B, although there is an interval 620 in which a change of the electric current amount of the BUS 450 temporarily exceeds the second threshold value (e.g., 5 A) after the triggering point (t1), since it is possible to ignore a case which temporarily exceeds the threshold value, as described above, the processor may not reduce the electric current amount of the BUS 450.

Figure 6C:
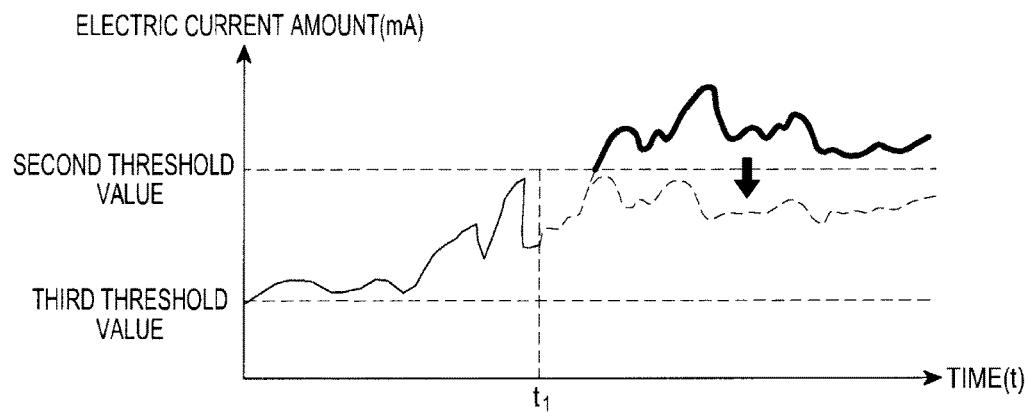
Figure 6D:
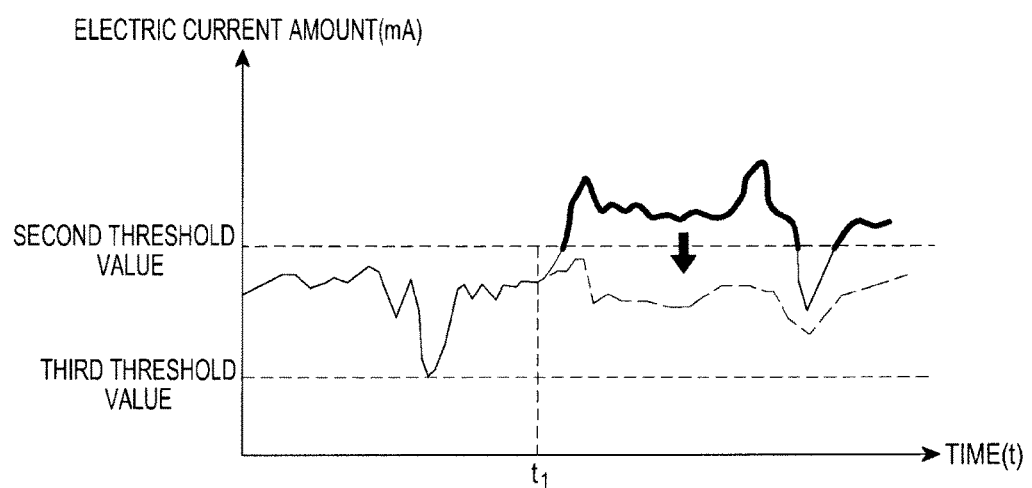

FIG. 6C illustrates, as an example, a change of an amount of electric current amount of the camera module 430. Referring now to FIG. 6C, in the change of the amount of electric current of the camera module 430, the amount of electric current exceeds the second threshold value (e.g., 3 A) for a time exceeding a predetermined time after the triggering point (t1). Therefore, the processor may control the amount of electric current the camera module 430 to be an amount of electric current less than the second threshold value. However, the amount of electric current controlled by the processor may be controlled not to be less than or equal to a third threshold value (e.g., 0.5 A) which is the minimum electric current amount required in operating the application.

FIG. 6D illustrates, as an example, a change of an amount of electric current of the mobile communication module 460. Referring now to FIG. 6D, the amount of electric current of the mobile communication module 460 exceeds the second threshold value (e.g., 2 A) while exceeding a predetermined time after the triggering point (t1). Therefore, the processor may control the electric current amount of the mobile communication module 430 to be an electric current amount less than the second threshold value. However, the amount of electric current controlled by the processor may be controlled not to be less than a third threshold value (e.g., 0.6 A) which is the minimum electric current amount required for an operation of the heating-managed component.

The second threshold value and the third threshold value according to various embodiments of the present disclosure may have the same or different values depending on a type of each of the heating-managed components. The second threshold value and the third threshold value may correspond to a unique value of the heating-managed component.

According to various embodiments of the present disclosure, the amount of electric current may decrease or increase through a control of a clock frequency input to the heating-managed component. In addition, the control of the amount of electric current as described with reference to FIGS. 6C and 6D may be controlled according to an amount of electric current (in the present disclosure, may be referred to as a "criterion/standard amount of electric current amount" for the convenience of the description) corresponding to the configured target surface temperature. In other words, the processor may control the first amount of electric current of the electronic device 20 to coincide with the reference amount of electric current or coincide within a predetermined error range, by reducing an electric current amount of a heating-managed component, which exceeds the second threshold value. To this end, information on the amounts of electric current of other components at the current time may be referred to. Further, although an embodiment in which an amount of electric current is controlled has been described in FIGS. 6A to 6D, the amount of electric current may be replaced by a power amount in various embodiments of the present disclosure.

According to various embodiments of the present disclosure, at least one operation among operations 310 to 380 may be repeatedly/continuously performed until a termination time point of the application. The termination time point of the application may refer to, for example, a time point at which a termination request of the application has been received from the user.

According to various embodiments of the present disclosure, an operation of determining whether the heating-managed component, which exceeds the second threshold value, exists may be determined on the basis of information on a temperature of each of the heating-managed components and/or a clock frequency input to each of the heating-managed components. Information on the temperature of each of the heating-managed components and/or the clock frequency input to each of the heating-managed components may be obtained by the processor. According to various embodiments of the present disclosure, in determining at least one heating-managed component which exceeds the second threshold value, a more accurate determination is possible by referring to the temperature and/or the clock frequency as well as an amount of an electric current (or a power amount) of the heating-managed components.

According to various embodiments of the present disclosure, the instructions may further include an instruction for controlling the processor to periodically monitor a power amount or an amount of electric current which is supplied to at least one component from among the plurality of electronic components.

According to various embodiments of the present disclosure, the instructions may further include an instruction for controlling the processor to receive, from a power management integrated circuit, a signal for determining the power amount or the amount of electric current which is supplied to each of the plurality of electronic components, and monitor the power amount or the electric current amount which is supplied to at least one component among the plurality of electronic components, in response to the received signal.

According to various embodiments of the present disclosure, the at least one electronic component may include at least one of a communication module, an application processor, a sensor module, and a camera module.

According to various embodiments of the present disclosure, the at least one component may include a Wi-Fi communication module and another component related to the at least one component may include an application processor.

According to various embodiments of the present disclosure, the processor may include an application processor.

According to various embodiments of the present disclosure, the electronic device, which is arranged in the housing, may further include a battery gauge connected to the battery, and the instructions may include an instruction for controlling the battery gauge to be output from the battery so as to sense a first amount of electric current and an instruction for controlling the processor to determine whether the sensed first amount of electric current exceeds a predetermined first threshold value.

According to various embodiments of the present disclosure, when the sensed first amount of electric current exceeds a predetermined first threshold value, an instruction for determining whether the power amount or electric current amount is equal to or exceeds the predetermined value may include an instruction for allowing the processor to determine whether a power amount or amount of electric current of the at least one component exceeds a predetermined second threshold value.

According to various embodiments of the present disclosure, an instruction for making a control to reduce the power amount or the amount of electric current when the at least one component exceeds the second threshold value may include an instruction for controlling a power amount or electric current amount of the component exceeding the second threshold value to be reduced.

Figure 7:
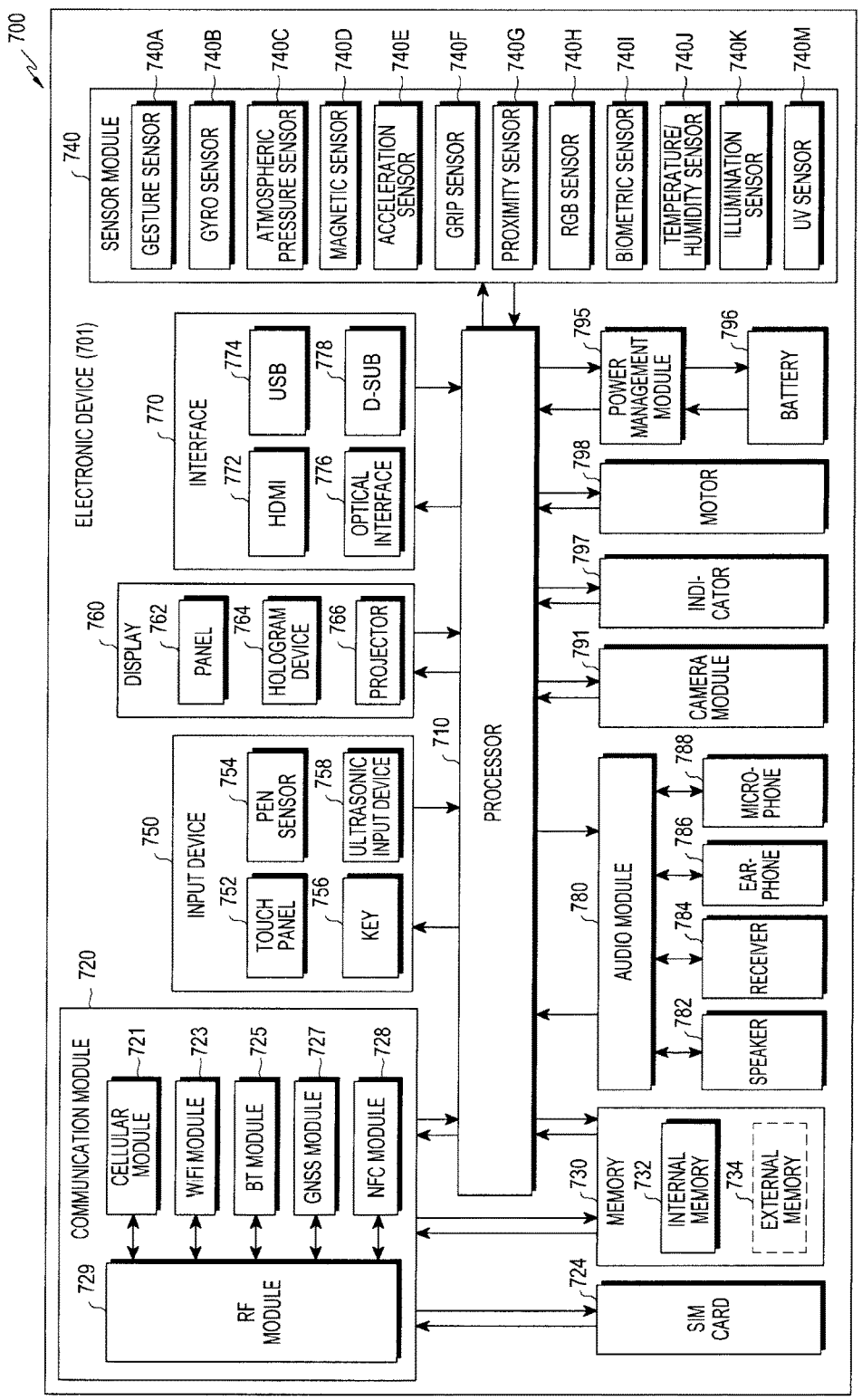
FIG. 7 is a block diagram illustrating an electronic device according to various embodiments of the present disclosure.

FIG. 7 is a block diagram illustrating an electronic device according to various embodiments of the present disclosure.

Referring now to FIG. 7, an electronic device 701 may include, for example, all or a part of the electronic device 101 shown in FIG. 1. The electronic device 701 may include at least one processor (e.g., an Application Processor (AP)) 710, a communication module 720, a subscriber identification module 724, a memory 730, a sensor module 740, an input device 750, a display 760, an interface 770, an audio module 780, a camera module 791, a power management module 795, a battery 796, an indicator 797, and a motor 798.

The processor 710 may control a plurality of hardware or software components connected to the processor 710 by driving an operating system or an application program and performing processing of various pieces of data and calculations. The processor 710 may be implemented by, for example, a System on Chip (SoC). According to an embodiment, the processor 710 may further include a Graphic Processing Unit (GPU) and/or an image signal processor. The processor 710 may include at least some (e.g., a cellular module 721) of the elements illustrated in FIG. 7. The processor 710 may load, into a volatile memory, instructions or data received from at least one (e.g., a non-volatile memory) of the other elements and may process the loaded instructions or data, and may store various data in a non-volatile memory.

The communication module 720 may have a configuration equal or similar to that of the communication interface 160 of FIG. 1. The communication module 720 may include, for example, a cellular module 721, a Wi-Fi module 723, a BT module 725, a GNSS module 727 (for example, a GPS module, a Glonass module, a Beidou module, or a Galileo module), an NFC module 728, and a Radio Frequency (RF) module 729.

The cellular module 721 may provide a voice call, an image call, a text message service, or an Internet service through, for example, a communication network. According to an embodiment, the cellular module 721 may distinguish between and authenticate electronic devices 701 within a communication network using a subscriber identification module (for example, the SIM card 724). According to an exemplary embodiment of the present disclosure, the cellular module 721 may perform at least some of the functions that the processor 710 may provide. According to an exemplary embodiment, the cellular module 721 may include a Communication Processor (CP).

Each of the Wi-Fi module 723, the BT module 725, the GNSS module 727, and the NFC module 728 may include, for example, a processor for processing data transmitted and received through the relevant module. According to some embodiments of the present disclosure, at least some (e.g., two or more) of the cellular module 721, the Wi-Fi module 723, the BT module 725, the GNSS module 727, and the NFC module 728 may be included in one Integrated Chip (IC) or IC package.

The RF module 729 may transmit/receive, for example, a communication signal (for example, an RF signal). The RF module 729 may include, for example, a transceiver, a Power Amp Module (PAM), a frequency filter, a Low Noise Amplifier (LNA), or an antenna. According to another embodiment of the present disclosure, at least one of the cellular module 721, the Wi-Fi module 723, the BT module 725, the GNSS module 727, and the NFC module 728 may transmit and receive RF signals through a separate RF module.

The subscriber identification module 724 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The non-transitory memory 730 (for example, the memory 130) may include, for example, an internal memory 732 or an external memory 734. The embedded memory 732 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

An external memory 734 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, or the like. The external memory 734 may be functionally and/or physically connected to the electronic device 701 through various interfaces.

The sensor module 740 may measure a physical quantity or detect an operation state of the electronic device 701, and may convert the measured or detected information into an electrical signal. The sensor module 740 may include, for example, at least one of a gesture sensor 740A, a gyro sensor 740B, an atmospheric pressure sensor 740C, a magnetic sensor 740D, an acceleration sensor 740E, a grip sensor 740F, a proximity sensor 740G, a color sensor 740H (for example, a red, green, blue (RGB) sensor), a biometric sensor 740I, a temperature/humidity sensor 740J, an illuminance sensor 740K, and a ultraviolet (UV) sensor 740M. Additionally or alternatively, the sensor module 740 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 740 may further include a control circuit for controlling one or more sensors included therein.

In some exemplary embodiments of the present disclosure, an electronic device 701 may further include a processor configured to control the sensor module 740 as a part of or separately from the processor 710, and may control the sensor module 740 while the processor 710 is in a sleep state.

The input device 750 may include, for example, a touch panel 752, a (digital) pen sensor 754, a key 756, or an ultrasonic input device 758. The touch panel 752 may use at least one of, for example, a capacitive type, a resistive type, an infrared type, and an ultrasonic type. Also, the touch panel 752 may further include a control circuit. The touch panel 752 may further include a tactile layer and provide a tactile reaction to the user.

The (digital) pen sensor 754 may include, for example, a recognition sheet which is a part of the touch panel or is separated from the touch panel. The key 756 may include, for example, a physical button, an optical key or a keypad. The ultrasonic input device 758 may detect ultrasonic waves generated by an input tool through a microphone (for example, a microphone 788) and identify data corresponding to the detected ultrasonic waves.

The display 760 (for example, the display 150) may include a panel 762, a hologram device 764 or a projector 766. The panel 762 may include a configuration identical or similar to that of the display 150 illustrated in FIG. 1. The panel 762 may be implemented to be, for example, flexible, transparent, or wearable. The panel 762 and the touch panel 752 may be implemented as one module. The hologram device 764 may show a three dimensional image in the air by using an interference of light. The projector 766 may display an image by projecting light onto a screen. The screen may be located, for example, inside or outside the electronic device 701. According to an exemplary embodiment, the display 760 may further include a control circuit for controlling the panel 762, the hologram device 764, or the projector 766.

The interface 770 may include, for example, a High-Definition Multimedia Interface (HDMI) 772, a Universal Serial Bus (USB) 774, an optical interface 776, or a D-subminiature (D-sub) 778. The interface 770 may be included in, for example, the communication interface 160 illustrated in FIG. 1. Additionally or alternatively, the interface 770 may include, for example, a Mobile High-definition Link (MHL) interface, a Secure Digital (SD) card/Multi-Media Card (MMC) interface, or an Infrared Data Association (IrDA) standard interface.

The audio module 780 may bilaterally convert, for example, a sound and an electrical signal. At least some elements of the audio module 780 may be included in, for example, the input/output interface 145 illustrated in FIG. 1. The audio module 780 may process sound information which is input or output through, for example, a speaker 782, a receiver 784, earphones 786, the microphone 788 or the like.

The camera module 791 is a device which may photograph a still image and a dynamic image. According to an embodiment, the camera module 791 may include one or more image sensors (for example, a front sensor or a back sensor), a lens, an Image Signal Processor (ISP) or a flash (for example, LED or xenon lamp).

The power management module 795 may manage, for example, power of the electronic device 701. According to an embodiment, the power management module 795 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 796, and a voltage, a current, or a temperature during the charging. The battery 796 may include, for example, a rechargeable battery or a solar battery.

The indicator 797 may display a particular state (e.g., a booting state, a message state, a charging state, or the like) of the electronic device 701 or a part (e.g., the processor 710) of the electronic device 701. The motor 798 may convert an electrical signal into mechanical vibration, and may generate vibration, a haptic effect, or the like. Although not illustrated, the electronic device 701 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 8:
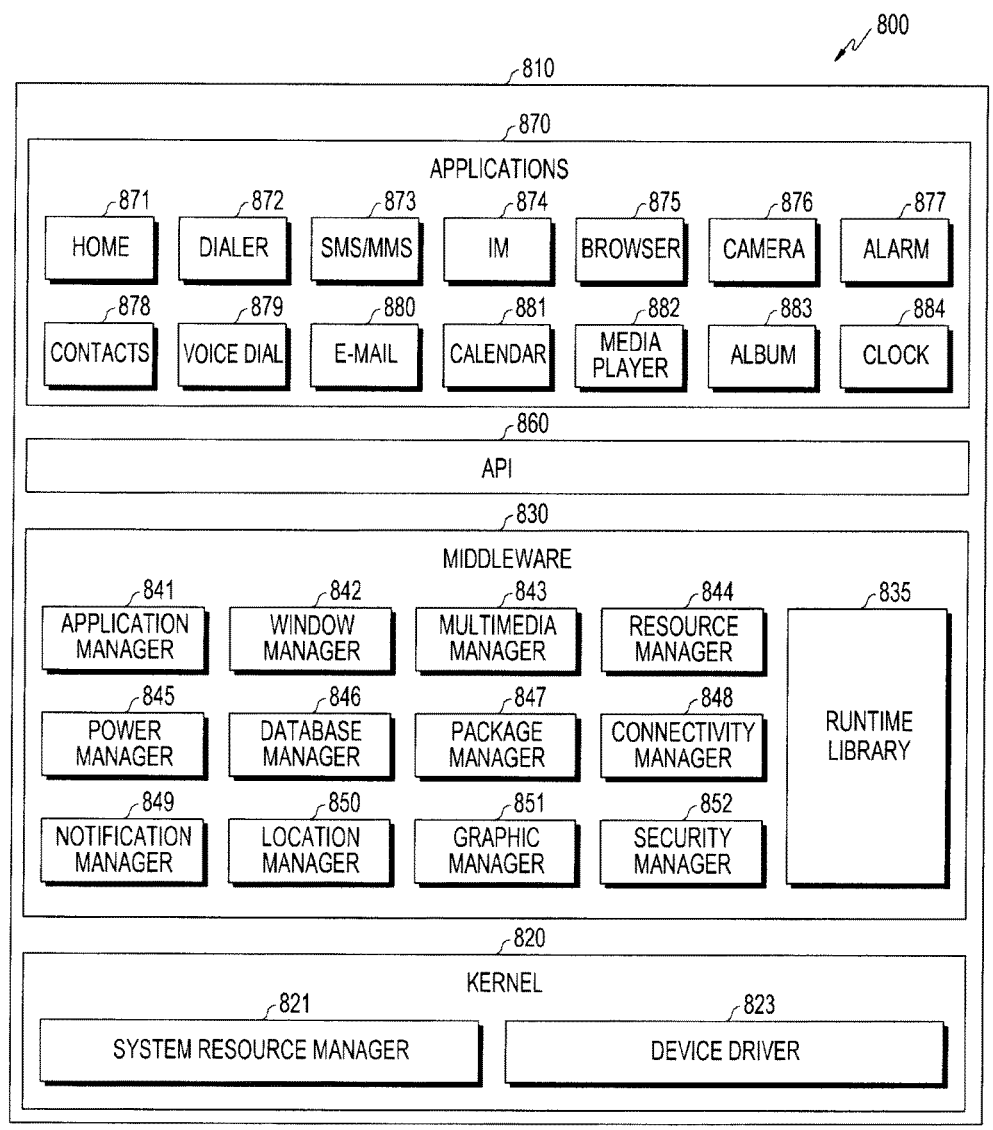
FIG. 8 is a block diagram illustrating a program module according to various embodiments of the present disclosure.

FIG. 8 is a block diagram illustrating an electronic device according to various embodiments of the present disclosure.

Referring now to FIG. 8, the program module 810 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like, just to name a few non-limiting possibilities.

The program module 810 may include a kernel 820, middleware 830, an Application Programming Interface (API) 860, and/or an application 870. At least some of the program module 810 may be preloaded on the electronic device, or may be downloaded from an external electronic device (e.g., the electronic device 102 or 104, or the server 106).

The kernel 820 (for example, the kernel 141) may include, for example, a system resource manager 821 and/or a device driver 823. The system resource manager 821 may perform the control, allocation, retrieval, or the like of system resources. According to an exemplary embodiment of the present disclosure, the system resource manager 821 may include a process manager, a memory manager, a file system manager, or the like. The device driver 823 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 830 may provide a function required by the applications 870 in common or provide various functions to the applications 870 through the API 860 so that the applications 870 can efficiently use limited system resources within the electronic device. According to an embodiment of the present disclosure, the middleware 830 (e.g., the middleware 143) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, and a security manager 852.

The runtime library 835 may include a library module which a compiler uses in order to add a new function through a programming language while the applications 870 are being executed. The runtime library 835 may perform input/output management, memory management, the functionality for an arithmetic function, or the like.

The application manager 841 may manage, for example, a life cycle of at least one of the applications 870. The window manager 842 may manage Graphical User Interface (GUI) resources used for the screen. The multimedia manager 843 may determine a format required to reproduce various media files, and may encode or decode a media file by using a coder/decoder (codec) appropriate for the corresponding format. The resource manager 844 may manage resources, such as a source code, a memory, a storage space, and the like of at least one of the applications 870.

The power manager 845 may operate together with a Basic Input/Output System (BIOS) to manage a battery or power, and may provide power information required for the operation of the electronic device. The database manager 846 may generate, search for, and/or change a database to be used by at least one of the applications 870. The package manager 847 may manage the installation or updating of an application distributed in the form of a package file.

The connectivity manager 848 may manage a wireless connection such as, for example, Wi-Fi or Bluetooth. The notification manager 849 may display or notify of an event, such as an arrival message, an appointment, a proximity notification, and the like, in such a manner as not to disturb the user. The location manager 850 may manage location information of the electronic device. The graphic manager 851 may manage a graphic effect, which is to be provided to the user, or a user interface related to the graphic effect. The security manager 852 may provide various security functions required for system security, user authentication, and the like. According to an exemplary embodiment of the present disclosure, when the electronic device (for example, the electronic device 101) has a telephone call function, the middleware 830 may further include a telephony manager for managing a voice call function or a video call function of the electronic device.

The middleware 830 may include a middleware module that forms a combination of various functions of the above-described elements. The middleware 830 may provide a module specialized for each type of OS in order to provide a differentiated function. Also, the middleware 830 may dynamically delete some of the existing elements, or may add new elements.

The API 860 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 870 (for example, the application programs 147) may include, for example, one or more applications which can provide functions such as home 871, dialer 872, SMS/MMS 873, Instant Message (IM) 874, browser 875, camera 876, alarm 877, contacts 878, voice dialer 879, email 880, calendar 881, media player 882, album 883, clock 884, health care (for example, measure exercise quantity or blood sugar), or environment information (for example, atmospheric pressure, humidity, or temperature information).

According to an exemplary embodiment of the present disclosure, the applications 870 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, a function for at least one external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an exemplary embodiment, the applications 870 may include applications (for example, a health care application of a mobile medical appliance or the like) designated according to attributes of the external electronic device 102 or 104. According to an embodiment of the present disclosure, the application 870 may include an application received from the external electronic device (e.g., the server 106, or the electronic device 102 or 104). According to an exemplary embodiment of the present disclosure, the application 870 may include a preloaded application or a third party application which can be downloaded from the server. Names of the elements of the program module 810, according to the above-described embodiments of the present disclosure, may change depending on the type of OS.

According to various exemplary embodiments of the present disclosure, at least some of the program module 810 may be implemented in software, firmware, hardware, or a combination of two or more thereof. At least some of the program module 810 may be implemented (e.g., executed) by, for example, the processor (e.g., the processor 210). At least some of the program module 810 may include, for example, a module, a program, a routine, a set of instructions, and/or a process for performing one or more functions.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

The term "module" as used herein may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
   a battery;
   a power management Integrated Circuit (IC) connected to the battery;
   a plurality of components that receive a power through the power management IC from the battery;
   a processor electronically connected to the plurality of components; and
   a memory electronically connected to the processor,
   wherein the memory stores instructions that upon execution cause the processor to:
   execute at least one application,
   monitor a power amount or an amount of electric current supplied to the plurality of the components through the power management IC,
   determine whether the power amount or the amount of electric current is equal to or exceeds a predetermined value,
   in response to determining that the power amount or the amount of electric current is equal to or exceeds a predetermined value, determining at least one component consuming a first power amount or a first amount of electronic current which exceeds a first threshold value while the at least one application is executed, wherein the at least one component is related to the at least one executed application from among the plurality of the components, and
   control an amount of electric current of the at least one component to be reduced to be less than a predetermined threshold value.

2. The electronic device of claim 1, wherein the processor periodically monitors the power amount or the amount of electric current supplied to the electronic device including the plurality of the components.

3. The electronic device of claim 1, wherein the processor receives a signal from the power management IC that indicates a power amount or an amount of electric current supplied to each of the plurality of components, and monitors the power amount or the amount of electric current supplied to the at least one component from among the plurality of components in response to the received signal.

4. The electronic device of claim 1, wherein the at least one component includes a communication module, an application processor, a sensor module, and a camera module.

5. The electronic device of claim 1, wherein the at least one monitored component includes a Wi-Fi communication module and an application processor.

6. The electronic device of claim 1, wherein the processor includes an application processor.

7. The electronic device of claim 1, further comprising:
a battery gauge arranged in a housing and connected to the battery to sense an output of a second amount of electric current,
wherein the processor determines whether the sensed second amount of electric current exceeds the first threshold value.

8. The electronic device of claim 7, wherein the processor determines whether the power amount or the amount of electric current of the at least one component exceeds a second threshold value when the sensed second amount of electric current exceeds the first threshold value.

9. The electronic device of claim 8, wherein, when the at least one component exceeds the second threshold value, the processor controls the power amount or the amount of electric current amount to be reduced, or the processor controls a power amount or an amount of electric current of a particular component exceeding the second threshold value to be reduced.

10. A method of operating an electronic device comprising:
executing at least one application;
monitoring a power amount or an amount of electric current supplied to a plurality of components arranged in the electronic device;
determining whether the power amount or the amount of electric current is equal to or exceeds a predetermined value;
in response to determining that the power amount or the amount of electric current is equal to or exceeds a predetermined value, determining at least one component consuming a first power amount or a first amount of electric current which exceeds a first threshold value while the at least one application is executed, wherein the at least one component is related to the at least one executed application from among the plurality of the components; and
controlling an amount of electric current of the at least one component to be reduced to be less than a predetermined threshold value.

11. The method of claim 10, further comprising:
periodically monitoring the power amount or the amount of electric current supplied to the electronic device including the plurality of the components.

12. The method of claim 10, further comprising:
receiving a signal indicating the power amount or the amount of electric current supplied to each of the plurality of the components from a power management IC by at least one processor arranged in the electronic device; and
monitoring the power amount or the amount of electric current supplied to the at least one component from among the plurality of the components in response to the received signal.

13. The method of claim 10, wherein the at least one component includes one or more of a communication module, an application processor, a sensor module, and a camera module.

14. The method of claim 10, wherein at least one monitored component includes a Wi-Fi communication module and an application processor.

15. The method of claim 10, wherein a processor arranged in the electronic device includes an application processor.

16. The method of claim 10, further comprising:
sensing by a battery gauge a second amount of electric current output from the battery of the electronic device; and
determining by at least one processor whether the sensed second amount of electric current is equal to or exceeds the first threshold value.

17. The method of claim 16, further comprising: determining, by the at least one processor, whether the power amount or the amount of electric current of the at least one component exceeds a second threshold value when the sensed second amount of electric current exceeds the first threshold value.

18. The method of claim 17, wherein controlling of the power amount or the amount of electric current to be reduced is applied to the at least one component exceeding the second threshold value.

19. A non-transitory computer readable recording medium in which machine executable instructions loaded into at least one processor of an electronic device causes execution of at least one operation comprising:
executing at least one application;
monitoring a power amount or an amount of electric current supplied to a plurality of components arranged in the electronic device through a power management Integrated Circuit (IC) connected to a battery of the electronic device;
determining whether the power amount or the amount of electric current is equal to or exceeds a predetermined value;
in response to determining that the power amount or the amount of electric current is equal to or exceeds a predetermined value, determining at least one component consuming a first power amount or a first amount of electronic current which exceeds a first threshold value while the at least one application is executed, wherein the at least one component is related to the at least one executed application from among the plurality of the components; and
controlling an amount of electric current of the at least one component to reduced to be less than a predetermined threshold value.

* * * * *